A. L. BOWER.
TRAIN-CONTROLLING DEVICE.
APPLICATION FILED AUG. 7, 1909.

1,115,494.

Patented Nov. 3, 1914.
3 SHEETS—SHEET 2.

Witnesses

Abram L. Bower, Inventor by C. A. Snow & Co.
Attorneys

A. L. BOWER.
TRAIN CONTROLLING DEVICE.
APPLICATION FILED AUG. 7, 1909.

1,115,494.

Patented Nov. 3, 1914.
3 SHEETS—SHEET 3.

Abram L. Bower, Inventor

Witnesses by

Attorneys

UNITED STATES PATENT OFFICE.

ABRAM L. BOWER, OF BOYERTOWN, PENNSYLVANIA.

TRAIN-CONTROLLING DEVICE.

1,115,494.  Specification of Letters Patent.  Patented Nov. 3, 1914.

Application filed August 7, 1909. Serial No. 511,818.

*To all whom it may concern:*

Be it known that I, ABRAM L. BOWER, a citizen of the United States, residing at Boyertown, in the county of Berks and State of Pennsylvania, have invented a new and useful Improvement in Train-Controlling Devices, of which the following is a specification.

The present invention relates to improvements in train controlling devices, and more particularly to that type of device carried by a motor car or locomotive and controlled through the medium of a closed track circuit, one object of the invention, being the provision of an arrangement, including a circuit controller, by which the deënergization of the cab relay produces a result only after the engine or motor has gone a certain distance, thus permitting the enginemen or motorman to control the train to bring it to a halt before the same is halted automatically.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed.

Figure 1:
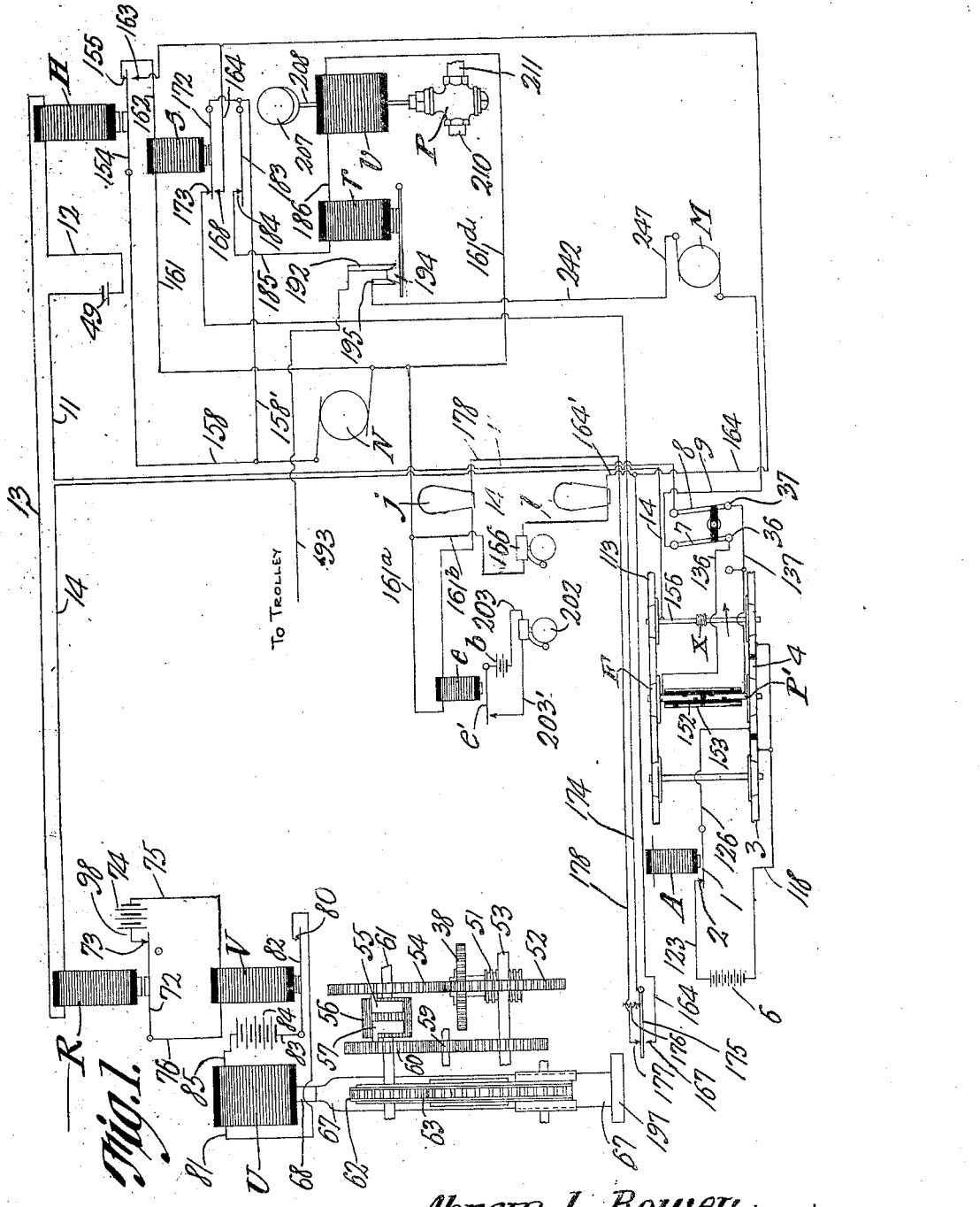
Figure 2:
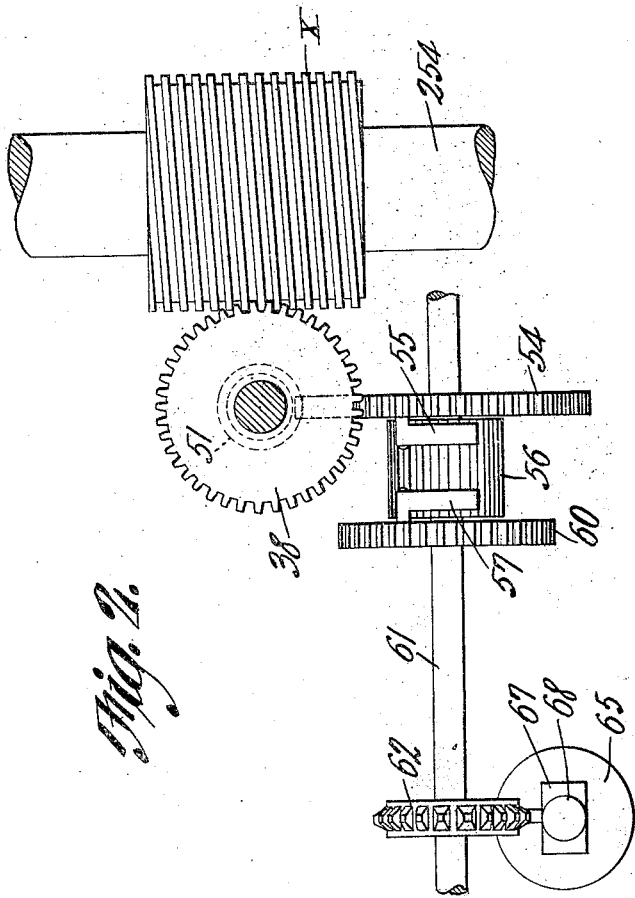
Figure 3:
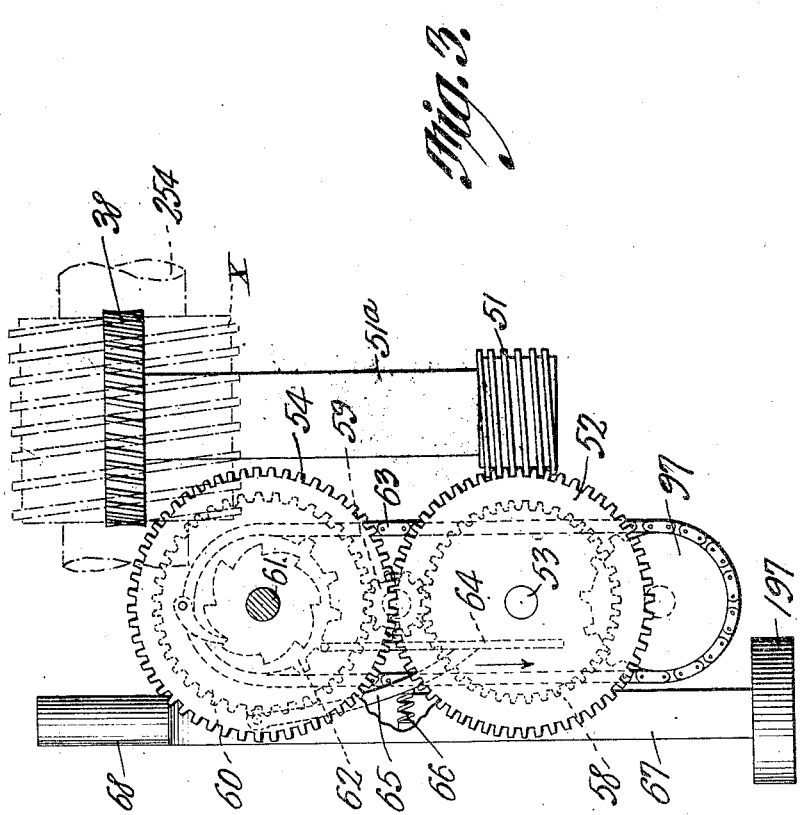

In the drawings—Figure 1 illustrates in diagram, the cab carried apparatus and portions of the block showing the present system in operation. Fig. 2 is a top plan view of the axle controlled portion of the present apparatus. Fig. 3 is an end view thereof.

Referring to the drawings, the numeral 6 designates the track battery, which has connected thereto, the conductor 123, the contact 2, the armature 1 of the relay A, which indicates what is known as a home relay and is itself controlled by a track circuit in the rear of the block, the same not being shown, the conductor 126, the short rail section 4, the insulated wheel P', the conductor 137, the contact 37, the member 8, of the reversing switch, the conductor 11, the maintaining battery 49, the conductor 12, the home relay H, the conductor 13, the relay R, the conductor 14, the axle 156, the rail 3 at the right as viewed in Fig. 1, and the conductor 118. Thus by this circuit both relays H and R are energized and their respective armatures 154 and 72 are attracted thereby.

In the present instance, the motive power is an electric motor M, the same being supplied by current either from an overhead trolley or third rail, the main part of the circuit therefor including the conductor 193 leading from a trolley or third rail (not shown), the stationary switch members 192 and 195, the armature switch member 194, the conductors 242 and 247, the motor M, the conductor 9, the switch member 7, the contact point 36, the conductor 136, the wheel F and the rail 113 which constitutes the ground.

The circuit controlled by the armature 154, includes the generator N, which is indicative of any source of energy upon the locomotive or car for supplying the various mechanisms thereupon, the conductor 158, the armature 154, the contact 155, the conductor 162, the relay s, and the conductor 161. Thus the relay s, which in reality is a repeating relay, is held energized as long as the armature 154 is attracted by its energized relay H.
The repeating relay s, controls two armatures 172 and 183, the same when energized causing the armature 172 to be attracted thereto so as to engage the contact 173, closing the following circuit:—the generator N, the conductors 158 and 158', the armature 172, the contact 173, the conductor 174, the switch 175 which is normally held in such position by the spring 176, the contact 177, the conductor 178, the clear indicating lamp j, the relay e, and the conductor 161ª. Thus the relay e is energized as well as the clear lamp j, indicating that the apparatus is in proper running condition. As the relay e is energized, the circuit including the battery b, the conductor 203, the bell 202, the conductor 203', the armature e' is held open, due to the armature e' being attracted by the relay e. As soon as the relay e becomes deënergized, however, the armature e' falls and closes the circuit to ring the alarm bell 202, this taking place when the switch 175 is operated as will later appear to disengage the contact 177. When the armature 183 is attracted by the relay s, the same closes the following circuit, which includes the generator N, the conductors 158 and 158', the armature 183, the contact 184, the conductor 185, the motive power switch controlling relay r, the conductor 186, the solenoid v, and the conductor 161ᵈ. Thus with the relay s energized, the motive power controlling switch or armature 194 is in such condition as to permit the flow of current to the motor M, while the solenoid v holds the valve P in closed position so that the air brake pipe 210 will not be permitted to vent through the vent pipe 211 and the stem 208 of the solenoid v is controlled in opposition to the attractive force of the same by means of the weight 207 so that the valve P is held closed by the attractive force of the solenoid v, and is opened due to the weight 207. It will thus be seen that as long as the relay s is energized, that the air brake system is held intact against automatic operation while the power current is permitted to flow properly to the motor M. When the relay s is deënergized, the armature 172 falls and engages the contact 168, closing the following circuit which includes the generator N, the conductors 158 and 158', the armature 172, the contact 168, the conductor 164, the conductor 164', the danger lamp 1, the audible alarm 166, and the conductors 161$^b$ and 161$^a$. Thus the danger signal l and the audible alarm 166 are energized as soon as the armature 172 engages the back contact 168. At the same time this is accomplished, the relay r is deënergized to permit the armature 194 to fall and thus open the circuit to the motor M, while the solenoid v is also deënergized to permit the valve P to be opened to thus vent the air brake system. Thus the motive power is cut off and the air brakes set.

In order to provide a means for the proper operation of the switch 175, the mechanism controlled by the axle 156 and its worm gear X, shown in detail in Figs. 2 and 3, is provided, the same being mechanically lowered to move the switch 175 in opposition to the spring 176, and to be electrically elevated to permit of the normal closure of the switch 175. The solenoid U is the electrical means for operating the core 68 carried by the member or plate 67 while the gear mechanism controlled by the worm gear X is the mechanical means for operating the member 67. The relay R which is controlled by the battery 6, normally attracts the armature 72 and by this means closes the following circuit, which includes the battery 74, the conductor 75, the relay V, the conductor 76, the armature 72, the contact 73 and the conductor 98. By this means, the relay V is energized, and in turn attracts the armature 82, closing the following circuit which includes the battery 84, the conductor 83, the armature 82, the contact 80, the conductor 81, the solenoid U, and the conductor 85. Thus the solenoid U is energized, and attracts the core 68 to elevate the plate or member 67 and in turn the disk 197 carried upon the lower end thereof and disposed for engaging the switch 175. When the relay H was deënergized, the armature 154 fell and engaged the back contact 163, causing the following circuit to be closed: the generator H, the conductor 158, the armature 154, the contact 163, the conductors 164 and 164', the danger lamp l, the audible alarm 166, and the conductors 161$^b$ and 161$^a$. This circuit is identical, for all practical purposes with that controlled by the armature 172 and contact 168, this being an additional or supplemental means for causing the energization of the signals l and 166.

The mechanism as shown in Figs. 2 and 3 for controlling the mechanical operation of the member 67, includes the gear 38 which is fixed upon and carried by the shaft 51$^a$, which in turn is provided with the worm gear 51. The worm gear 51 is in mesh with the gear 52, which in turn is in mesh with the gear 54 of a similar size, said gears 52 and 54 being journaled upon the respective shafts 53 and 61. Thus as the shaft 51$^a$ is rotated from the car axle, the gear 52 will transmit motion to the gear 54. The gear 54 is loosely mounted upon the shaft 61, and also loosely mounted upon said shaft and spaced therefrom, is a gear 60 which is operated from the gear 58, through the small gear 59. It will thus be seen that regardless of what direction the gear X is rotated, due to the forward or backward movement of the locomotive or car, that either one of the gears 54 or 60 will be the operating gear to control the movement of the sprocket chain 63. Mounted upon the shaft 61 between the gears 54 and 60, the same being fixed thereto, is a ratchet 56, while fastened upon the inner faces of the respective gears 54 and 60 are the pawls 55 and 57, and thus by means of either one of the gears 54 or 60, the operating shaft 61 is moved in a constant or one direction so as to rotate the sprocket 62 carrying the sprocket chain 63 which is guided and spaced by the idler 97. It will thus be seen that as soon as the solenoid U is deënergized, that the constantly rotating chain 63 will engage the pawl 65 carried by the plate 67 and thus move the plate or member 67 downwardly so that the disk 197 will be brought into engagement with the switch 175 to move it from the closed position or from engagement with the contact 177 to the contact 167. The pawl 65 is held in engagement with the plate 64 in the path of the chain 63 by means of the spring 66 which will offer slight resistance to the chain so that when the solenoid U is energized, the plate 67 will not be moved by the chain, but upon the deënergization of the solenoid U, the friction between the moving chain and pawl 65 will be sufficient to cause the plate 67 to be moved by the chain.

As illustrated in Fig. 3, the strand of chain between the plate or rod 67 and the stationary plate 64 has a movement in the direction of the arrow, the spring 66 holding the pawl 65 in engagement with the plate 64 so that as the pawl 65 is pressed against the chain in front of the plate 64 by the spring 66, the friction between the chain and the pawl will tend to move the plate 67 downwardly, thus producing the desirable timed action after the solenoid U is deënergized to retard or delay the deenergization of the relay $r$ and the solenoid $v$. Such delay is in accordance to the distance that the train is permitted to travel after having received the stop signal. When the plate 67 has reached its full uppermost position due to the energization of the solenoid U, the disk or switch operating member 197 will release the switch 175 and permit it to engage the contact 177 to maintain the relay $r$ and the solenoid $v$ energized. The maintaining battery 49, maintains the relays R and H, energized when the train is between the sectional rails 4, or upon rails 113 and 3, the circuit being as follows: the battery 49, the conductor 12, the relay H, the conductor 13, the relay R, the conductor 14, the axle 156, the rail 3, the wheel P', the conductor 137, the contact 37, the member 8 and the conductor 11.

What is claimed is:

In a controlling device for engines, a cab relay, a traffic power controlling mechanism for the engine, and means operated by the engine and by means of which the deënergization of the cab relay produces the stopping operation of the power controlling mechanism only after the engine has gone a certain distance beyond the point at which the said deënergization occurred.

In witness whereof, I have signed my name to this specification in the presence of two subscribing witnesses this sixth day of August, 1909.

ABRAM L. BOWER.

Witnesses:
WILLIAM H. Fox,
MARY H. Fox.